United States Patent
Moffatt et al.

(10) Patent No.: US 9,461,698 B2
(45) Date of Patent: Oct. 4, 2016

(54) COMMUNICATIONS DEVICE WITH SIMULTANEOUS TRANSMIT AND RECEIVE AND RELATED METHODS

(71) Applicant: HARRIS CORPORATION, Melbourne, FL (US)

(72) Inventors: Christopher D. Moffatt, Palm Bay, FL (US); John E. Hoffmann, Indialantic, FL (US); Richard Lilley, Grant, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 14/091,665

(22) Filed: Nov. 27, 2013

(65) Prior Publication Data

US 2015/0146765 A1 May 28, 2015

(51) Int. Cl.
| | |
|---|---|
| *H04B 1/38* | (2015.01) |
| *H04B 1/62* | (2006.01) |
| *H04B 1/40* | (2015.01) |
| *H04B 1/525* | (2015.01) |

(52) U.S. Cl.
CPC *H04B 1/62* (2013.01); *H04B 1/40* (2013.01); *H04B 1/525* (2013.01)

(58) Field of Classification Search
CPC .......... H04B 1/62; H04B 1/40; H04B 1/525; H04B 7/04; H04L 27/368; H04L 27/2662; H04L 27/2647; H04L 27/2678; H04L 27/2646
See application file for complete search history.

(56) References Cited

U.S. PATENT DOCUMENTS

| | | |
|---|---|---|
| 5,564,420 A | 10/1996 | Nazarian et al. |
| 5,596,439 A | 1/1997 | Dankberg et al. |
| 6,011,952 A | 1/2000 | Dankberg et al. |
| 6,725,017 B2 | 4/2004 | Blount et al. |
| 6,907,093 B2 | 6/2005 | Blount et al. |
| 7,020,451 B2 | 3/2006 | Sugar et al. |
| 7,349,505 B2 | 3/2008 | Blount et al. |
| 7,366,520 B2 | 4/2008 | Haustein et al. |
| 7,426,242 B2 | 9/2008 | Thesling |
| 7,634,023 B2 | 12/2009 | Thesling |
| 7,904,020 B2 | 3/2011 | Dankberg et al. |
| 7,929,909 B2 | 4/2011 | Dankberg et al. |
| 7,962,174 B2 | 6/2011 | Lipowski et al. |
| 8,170,158 B2 | 5/2012 | Thesling et al. |
| 2003/0021367 A1 | 1/2003 | Smith |
| 2003/0156632 A1* | 8/2003 | Dowling ................ 375/222 |
| 2004/0048576 A1 | 3/2004 | Hildebrand et al. |
| 2004/0142700 A1* | 7/2004 | Marinier ................ 455/454 |
| 2004/0203458 A1* | 10/2004 | Nigra ................ 455/67.13 |

(Continued)

OTHER PUBLICATIONS

Jain et al., "Practical, Real-time, Full Duplex Wireless," MobiCom '11, Sep. 19-23, 2011, Las Vegas Nevada, 12 pages.

(Continued)

*Primary Examiner* — Syed Haider
(74) *Attorney, Agent, or Firm* — Allen, Dyer, Doppelt, Milbrath & Gilchrist, P.A.

(57) ABSTRACT

A communications device may include a transmit path, a receive path operable simultaneously with the transmit path and at a same frequency as the transmit path, and processing circuitry. The processing circuitry may be configured to generate a baseband signal for the transmit path, generate a feedforward signal based upon the baseband signal, and use the feedforward signal to reduce self-interference in the receive path from the transmit path.

19 Claims, 14 Drawing Sheets

(56) References Cited

U.S. PATENT DOCUMENTS

| | | | |
|---|---|---|---|
| 2005/0190870 A1* | 9/2005 | Blount | H04B 1/525 375/346 |
| 2006/0240786 A1* | 10/2006 | Liu | H03F 1/3247 455/114.3 |
| 2008/0039024 A1 | 2/2008 | Ikeda et al. | |
| 2008/0211576 A1* | 9/2008 | Moffatt | H03F 1/3247 330/149 |
| 2010/0039100 A1* | 2/2010 | Sun et al. | 324/123 R |
| 2010/0111238 A1* | 5/2010 | Xu et al. | 375/346 |
| 2010/0323641 A1* | 12/2010 | Aparin | H03F 1/34 455/114.3 |
| 2011/0134810 A1 | 6/2011 | Yamamoto et al. | |
| 2011/0195673 A1 | 8/2011 | Pratt et al. | |
| 2012/0140860 A1 | 6/2012 | Rimini et al. | |

OTHER PUBLICATIONS

Choi et al., "Full-Duplex Wireless Design," Aug. 1, 2013, pp. 1-4.
Jain et al., "Practical, Real-time, Full Duplex Wireless", MobiCom'11, Sep. 19-23, 2011, Las Vegas, Nevada, USA, pp. 1-12.

* cited by examiner

TRACE A OFFSET:     0.00 Rx  MAX    −0.039 dB

TRACE A OFFSET:     83.82 Rx MAX    −0.257 dB

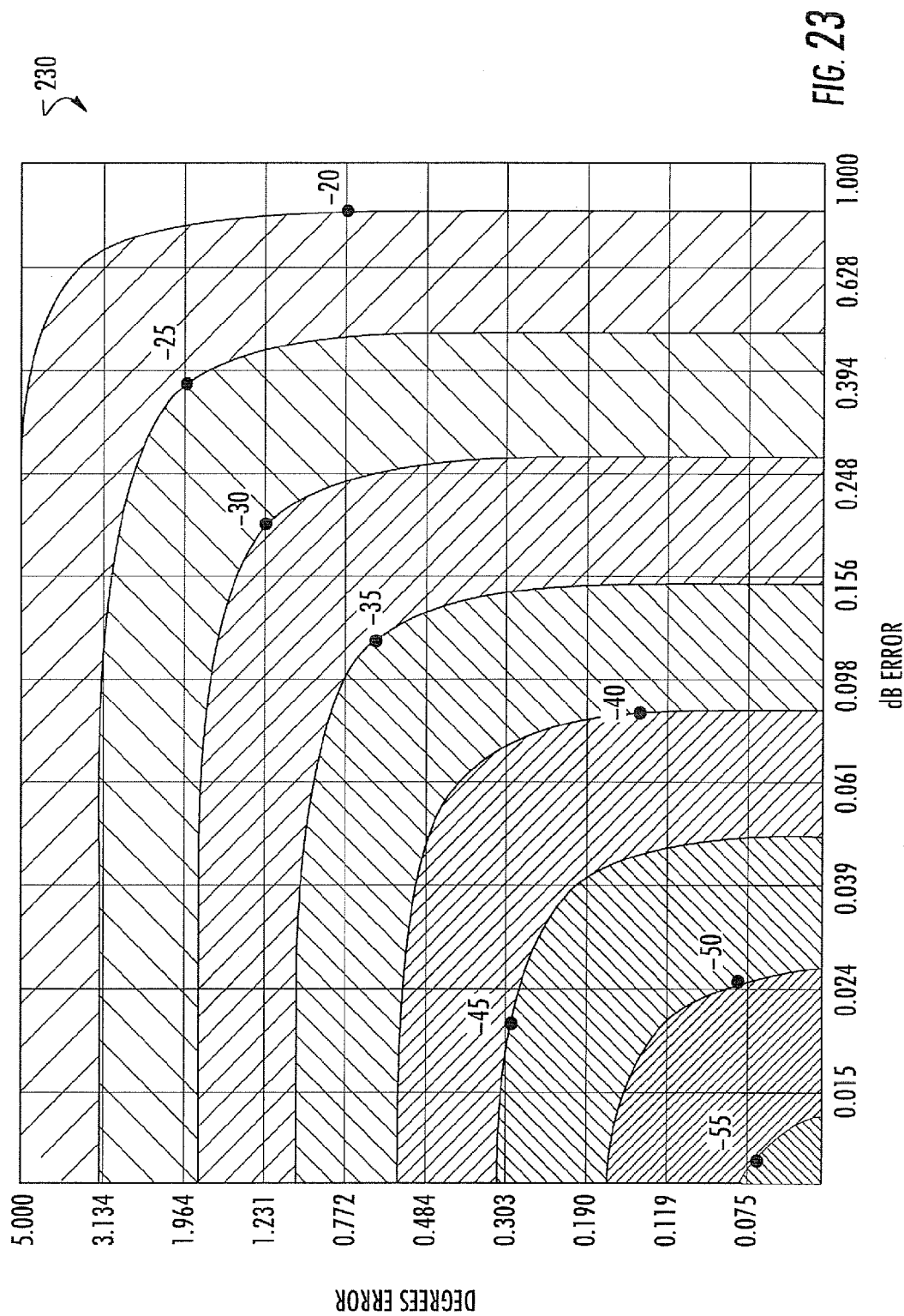

COMMUNICATIONS DEVICE WITH SIMULTANEOUS TRANSMIT AND RECEIVE AND RELATED METHODS

FIELD OF THE INVENTION

The present invention relates to the field of communications, and, more particularly, to wireless communications and related methods.

BACKGROUND OF THE INVENTION

Mobile communications devices have become an integral part of society over the last two decades. Indeed, a large percentage of the population owns a mobile communications device, for example, a cell phone. The typical mobile communications device includes an antenna, and a transceiver coupled to the antenna. The transceiver and the antenna cooperate to transmit and receive communications signals.

The typical transceiver includes a power amplifier for amplifying low voltage signals for transmission via the antenna. Given that most mobile communications devices operate on limited battery power, energy efficient power amplifiers may be desirable. More specifically and as will be appreciated by those skilled in the art, Class C and E power amplifiers are common in mobile communications devices since they are efficient power amplifiers. These classes of power amplifiers are more efficient than Class A or B amplifiers, for example, but are subject to performance tradeoffs, for example, they may be nonlinear over certain frequencies and may introduce greater amounts of distortion into the amplified signal (if the signal requires a linear amplifier).

An approach to compensating for this tradeoff is to encode transmitted signals with constant envelope (CE) or continuous phase modulation (CPM) waveforms. These modulations provide for lower energy demands on the power amplifier of the transceiver, for example, by reducing the peak-to-average power ratio (PAPR), increasing average transmit power (providing greater transmission range), and increasing amplifier efficiency.

For example, U.S. Patent Application Publication No. 2008/0039024 to Ikeda et al. discloses an amplifying circuit. The amplifying circuit processes an input orthogonal frequency-division multiplexing (OFDM) signal and provides a pair of CE output signals to provide better power efficiency and less distortion.

When communications devices communicate with each other, the associated waveform exists in a frequency band. Typically, the associated frequency band is standardized and regulated by governmental bodies to prevent unintended interference with other wireless devices. A potential issue that has impacted wireless development is a shortage of unused spectrum. Indeed, as modern communications become more data intensive, wireless operators are scrambling to acquire more spectrum rights to expand network throughput, which has proven to be quite costly.

One approach to this problem is to improve spectral efficiency, i.e. push more data through the allowed frequency band. For example, multiple-input-multiple-output (MIMO) approaches comprise deploying multiple antennas in a device to enhance reception quality and improve data transfer rates.

Another approach is disclosed in "Practical, Real-time, Full Duplex Wireless" by Mayank et al. This approach improves spectral efficiency by transmitting and receiving on the same frequency band. The method includes using a balun transformer coupled to the transmit path to produce an inverted version of the transmitted signal. This inverted signal is summed with the received signal to reduce self-interference.

SUMMARY OF THE INVENTION

In view of the foregoing background, it is therefore an object of the present invention to provide a communications device with improved spectral efficiency.

This and other objects, features, and advantages in accordance with the present invention are provided by a communications device that may comprise a transmit path, a receive path operable simultaneously with the transmit path and at a same frequency as the transmit path, and processing circuitry. The processing circuitry may be configured to generate a baseband signal for the transmit path, generate a feedforward signal based upon the baseband signal, and use the feedforward signal to reduce self-interference in the receive path from the transmit path. Advantageously, the communications device may use the same frequency band for simultaneous transmit/receive.

In particular, the processing circuitry may be configured to generate the feedforward signal as an inverted replica of the baseband signal. The receive path may be configured to generate an error signal so that the feedforward signal is further based upon the error signal. The error signal may be based upon a frequency domain response of the receive path.

In some embodiments, the transmit path may have at least one non-linear characteristic, and the processing circuitry may be configured to pre-distort the baseband signal based upon the at least one non-linear characteristic. The transmit path may have a transmit output signal, and the processing circuitry may be configured to time align the feedforward signal based upon the transmit output signal and scale the feedforward signal based upon the transmit output signal.

For example, the processing circuitry may be configured to generate the baseband signal comprising an OFDM signal. The receive path may comprise a combiner configured to combine the feedforward signal and a receive signal. The communications device may further comprise at least one antenna coupled to the transmit and receive paths. Also, the at least one antenna may comprise a first antenna coupled to the transmit path, and a second antenna coupled to the receive path.

Another aspect is directed to a method of operating a communications device comprising a transmit path, and a receive path operable simultaneously with the transmit path and at a same frequency as the transmit path. The method may comprise operating processing circuitry coupled to the transmit and receive paths to generate a baseband signal for the transmit path, generate a feedforward signal based upon the baseband signal, and use the feedforward signal to reduce self-interference in the receive path from the transmit path.

BRIEF DESCRIPTION OF THE DRAWINGS

FIG. 23 is a diagram of amplitude and time-alignment precision in the communications device of FIG. 2.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
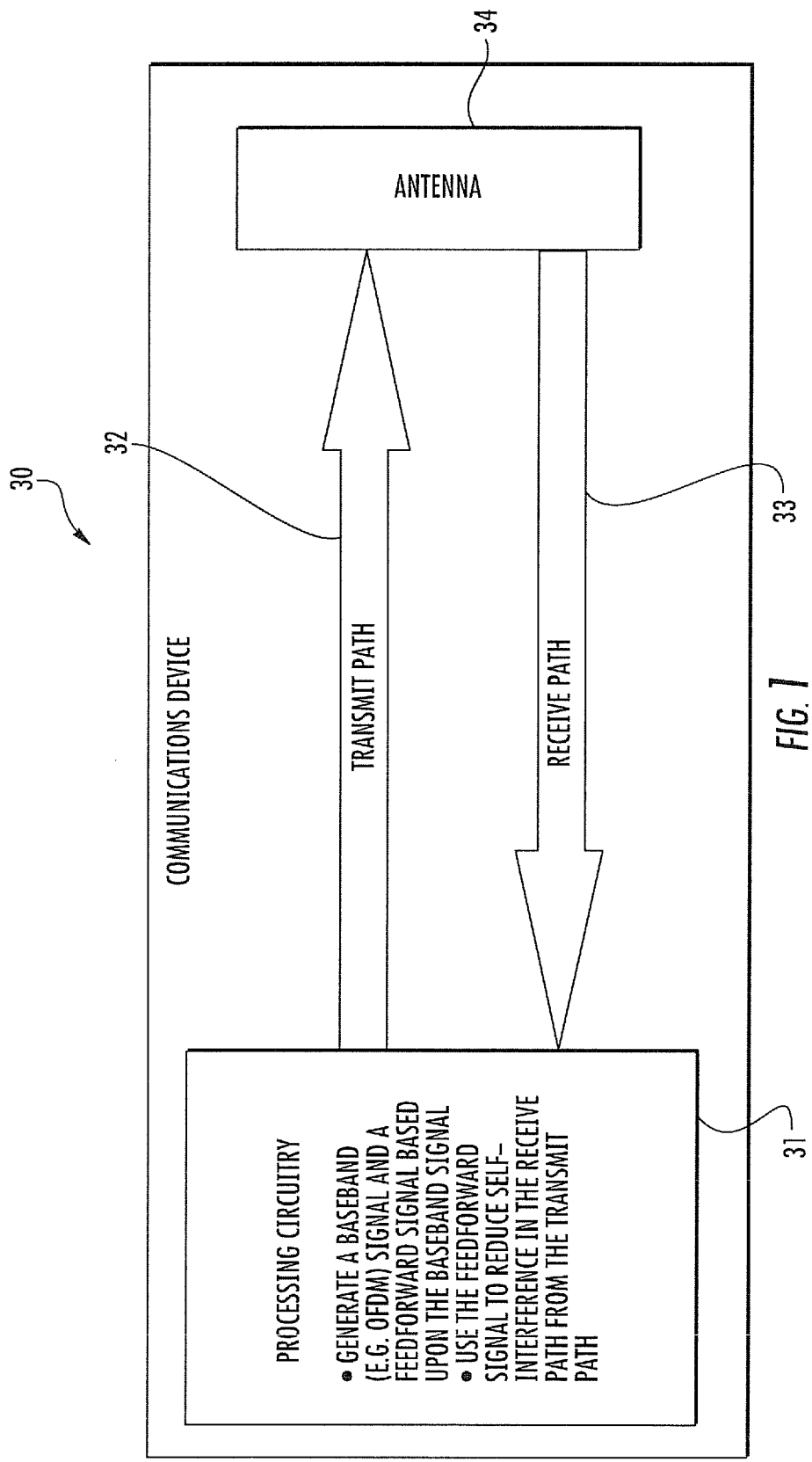
FIG. 1 is a schematic diagram of a communications device, according to the present invention.

Referring initially to FIG. 1, a communications device 30 according to the present invention is now described. The communications device 30 includes a transmit path 32, a receive path 33 operable simultaneously with the transmit path and at a same frequency as the transmit path, and processing circuitry 31. The processing circuitry 31 may be implemented with typical digital signal processing resources. Helpfully, the communications device 30 can utilize the same spectral resources for simultaneous transmit and receive operations, thereby increasing spectral efficiency.

The processing circuitry 31 is configured to generate a baseband signal for the transmit path 32. For example, the processing circuitry 31 may be configured to generate the baseband signal comprising an OFDM signal.

The processing circuitry 31 is configured to generate a feedforward signal based upon the baseband signal, and use the feedforward signal to reduce self-interference in the receive path 33 from the transmit path 32. The communications device 30 also includes an antenna 34 coupled to the transmit and receive paths 32-33 and configured to receive and transmit respective signals at the same frequency simultaneously. In some embodiments of the communications device 30, the communications device may include a plurality of input and output antennas for operating in a MIMO mode of operation.

Figure 2:
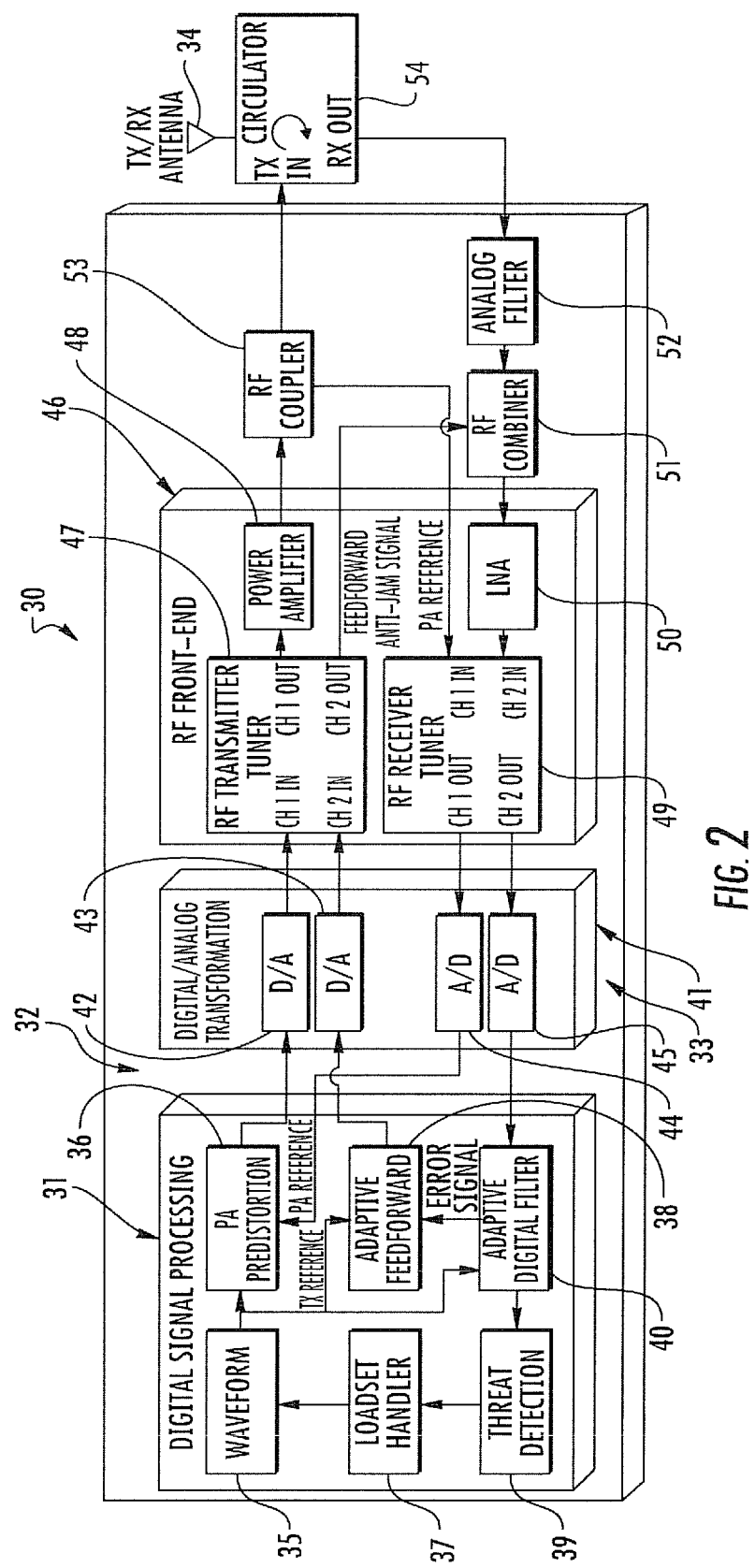
FIG. 2 is a more detailed schematic diagram of the communications device as shown in FIG. 1.

Referring now additionally to FIG. 2, the communications device 30 illustratively includes a digital/analog transformation block 41 coupled to the processing circuitry 31, and an RF front end block 46 coupled to the digital/analog transformation block. The processing circuitry 31 illustratively includes a waveform circuit 35 configured to generate the baseband signal, and a power amplifier predistortion circuit 36 coupled to waveform circuit and configured to predistort the baseband signal based upon a power amplifier reference signal (the amplifier reference signal generated by an analog-to-digital converter 44, see below). In particular, the transmit path 32 may have at least one non-linear characteristic (e.g. non-linear power amplifier), and the processing circuitry 31 (in the illustrated embodiment, the power amplifier predistortion circuit 36) may be configured to pre-distort the baseband signal based upon the at least one non-linear characteristic and using the power amplifier reference signal.

The processing circuitry 31 illustratively includes an adaptive feedforward circuit 38 configured to generate the feedforward signal based upon an error signal and a transmission reference signal from the waveform circuit 35. The adaptive feedforward circuit 38 may be configured to generate the feedforward signal as an inverted replica of the baseband signal. In particular, the feedforward signal may comprise the self-interference signal phase shifted 180 degrees.

The processing circuitry 31 illustratively includes an adaptive digital filter circuit 40 configured to generate the error signal, and a threat detection circuit 39 coupled to the adaptive digital filter circuit, which receives an output of the receive path 33. Accordingly, the receive path 33 is configured to generate the error signal so that the feedforward signal is further based upon the error signal. The error signal may be based upon a frequency domain response of the receive path 33. The processing circuitry 31 illustratively includes a loadset handler circuit 37 coupled between the threat detection circuit 39 and the waveform circuit 35.

The digital/analog transformation block 41 illustratively includes first and second digital-to-analog converters (DACs) 42-43, and a pair of analog-to-digital converters (ADCs) 44-45. The first DAC 42 is configured to process the predistorted baseband signal from the power amplifier predistortion circuit 36, and the second DAC 43 is configured to process the feedforward signal from the adaptive feedforward circuit 38.

The RF front end block 46 includes an RF transmitter tuner 47 configured to receive the outputs of the first and second DACs 42-43, and a power amplifier 48 configured to receive the output from the first DAC after processing in the RF transmitter tuner 47. The communications device 30 illustratively includes an RF coupler 53 configured to receive the amplified signal from the power amplifier 48, and generate the power amplifier reference signal, and an antenna circulator (coupler) 54 coupled to the RF coupler and the antenna 34, thereby completing the transmit path 32.

The communications device 30 includes an analog filter circuit 52 configured to process a received signal (including the self-interference from the transmit path 32) from the antenna circulator 54, which begins the receive path 33, and an RF combiner 51 configured to combine the received signal with the output from the second DAC 43 after processing in the RF transmitter tuner 47, i.e. the processed feedforward signal. Generally, the transmit path 32 has a transmit output signal, and the processing circuitry 31 is configured to time align the feedforward signal based upon the transmit output signal and scale the feedforward signal based upon the transmit output signal. Advantageously, this processed feedforward signal should effectively cancel out the self-interference from the transmitted signal, thereby permitting an unsaturated desired signal to be processed by the receive path 33. In other words, the self-interference signal is subtracted out of the receive path 33. In particular, depending on the instantaneous bandwidth and the spurious free dynamic range of the first and second ADCs 44-45, reduction of the self-interference may be more than 40 dB. In addition to this upstream self-interference mitigation approach, the communications device 30 may include downstream methods, such as using typical digital signal processing approaches (e.g. filters).

The RF front end block 46 includes a low noise amplifier (LNA) 50 receiving the output of the RF combiner 51, and a RF receiver tuner 49 configured to process the power amplifier reference signal and the output of the LNA. The first ADC 44 processes the power amplifier reference signal and outputs it to the power amplifier predistortion circuit 36, and the second ADC processes the received signal from the LNA 50 and outputs it to the adaptive digital filter circuit 40. The power amplifier predistortion circuit 36 uses the power amplifier reference signal to determine the at least one non-linear characteristic regarding the transmit path 32.

As will be appreciated by those skilled in the art, the antenna circulator 54 may inject unwanted self-interference into the receive path 33 during transmit operations. Since the transmit signal is relatively high powered compared to the desired receive signal, the self-interference may saturate the LNA 50 and cause the first and second ADCs 44-45 to clip. Most of the RF energy from the transmit path 32 is sent out of the antenna 34, due to the antenna circulator 54, but some of the energy goes into the receive path 33.

The processing circuitry 31 has a perfect reference of the transmit waveform, since it is locally generated. The amount of transmit energy seen by the receive path 33 depends on the transmit-to-receive isolation. The power level is typically such that it would saturate the LNA 50 and first and second ADCs 44-45 (in some instances, the first ADC 45 only saturates). The antenna 34 receives target signal of interest (SOI) r(t) plus noise n(t) (Additive white Gaussian noise+interferers). The transmit signal undergoes frequency selective amplitude and phase variations because of the antenna mismatch, or non-uniform voltage standing wave ratio (VSWR), across a wide frequency range. The receiver sees the transmit signal x(t) convolved with the channel response h(t), plus the signals coming in from the antenna. The communications device 30 may adaptively model the channel response in order to subtract the loud transmit signal before it reaches critical receiver components, such as the LNA 50 and the first and second ADCs 44-45, in order to preserve dynamic range. Timing and amplitude accuracy may need to be precise in order to achieve cancelation. For example, about 0.1 dB amplitude and 0.1 degree phase error results in a 50 dB cancellation. The predistortion is used to provide enough linearity to properly amplitude and time align the adaptive feedforward interference cancellation signal, also referred to as the anti-self-interference signal or anti-jam signal, in order to reduce the power level of the transmitter waveform before saturating the receiver LNA 50. Note, if no feedforward interference cancellation were applied, due to the high power amplifier closely located to the sensitive receiver, the transmit signal would be jamming the receiver; therefore, the feedforward signal is interchangeably referred to as the anti-jam signal in the block diagram. Adaptive filtering can also be used to remove additional transmit signal from the digitized waveform to further improve receive symbol detection.

In another embodiment of the communications device 30, feedforward cancellation may use real-time feedback. This allows cancellation and power amplifier linearization to occur in a signal step, and can improve performance. The feedback loop (i.e. processing circuitry 31 to the RF coupler 53 and back to the processing circuitry) should have less delay than the transmit loop (i.e. processing circuitry to the antenna circulator 54 and back to the processing circuitry) in order for this to work. The advantage of this technique is that the RF coupler 53 provides a clean sample of PA output 48 that can be used to generate the feedforward interference mitigation signal without the need for PA linearization (i.e. solely by time-amplitude alignment and channel compensation); however, this aspect can only succeed with sufficiently low latency in the feedback loop described above. If the latency is too high in the feedback loop, then predistortion is required. Additional delay can be added to the transmitter-to-receiver loop from an analog filter group delay or coiled cable.

Advantageously, the communications device 30 may provide a combination of required algorithms to allow cancellation of the transmitted signal in the receive path 33 to maximize receiver sensitivity. This combination may include using OFDM-based adaptive sub-band power amplifier predistortion, adaptive feedforward compensation of the transmitted signal in the receive path 33, using the RF Coupler 53 at output of power amplifier 48 to provide a sample point within feedback loop that is tolerant to large delays, using a digital power amplifier reference signal as input to power amplifier linearization algorithm, using a transmit reference signal as input to adaptive feedforward algorithm, using the RF combiner 51 at receiver input stage for allowing injection of feedforward interference mitigation signal, using adaptive digital filter to compensate for the frequency domain response of receive chain, antenna, and miscellaneous analog components, and using digital error signal generation as input to adaptive feedfoward algorithm. Also, the communications device 30 may adapt the algorithm for operation in multipath. Another ancillary benefit to the linearization algorithm is that communications device 30 may utilize less expensive power amplifiers, i.e. non-linear class C/E amplifiers.

Another aspect is directed to a method of operating a communications device 30 comprising a transmit path 32, and a receive path 33 operable simultaneously with the transmit path and at a same frequency as the transmit path. The method may comprise operating processing circuitry 31 coupled to the transmit and receive paths 32-33 to generate a baseband signal for the transmit path, generate a feedforward signal based upon the baseband signal, and use the feedforward signal to reduce self-interference in the receive path from the transmit path.

Figure 3:
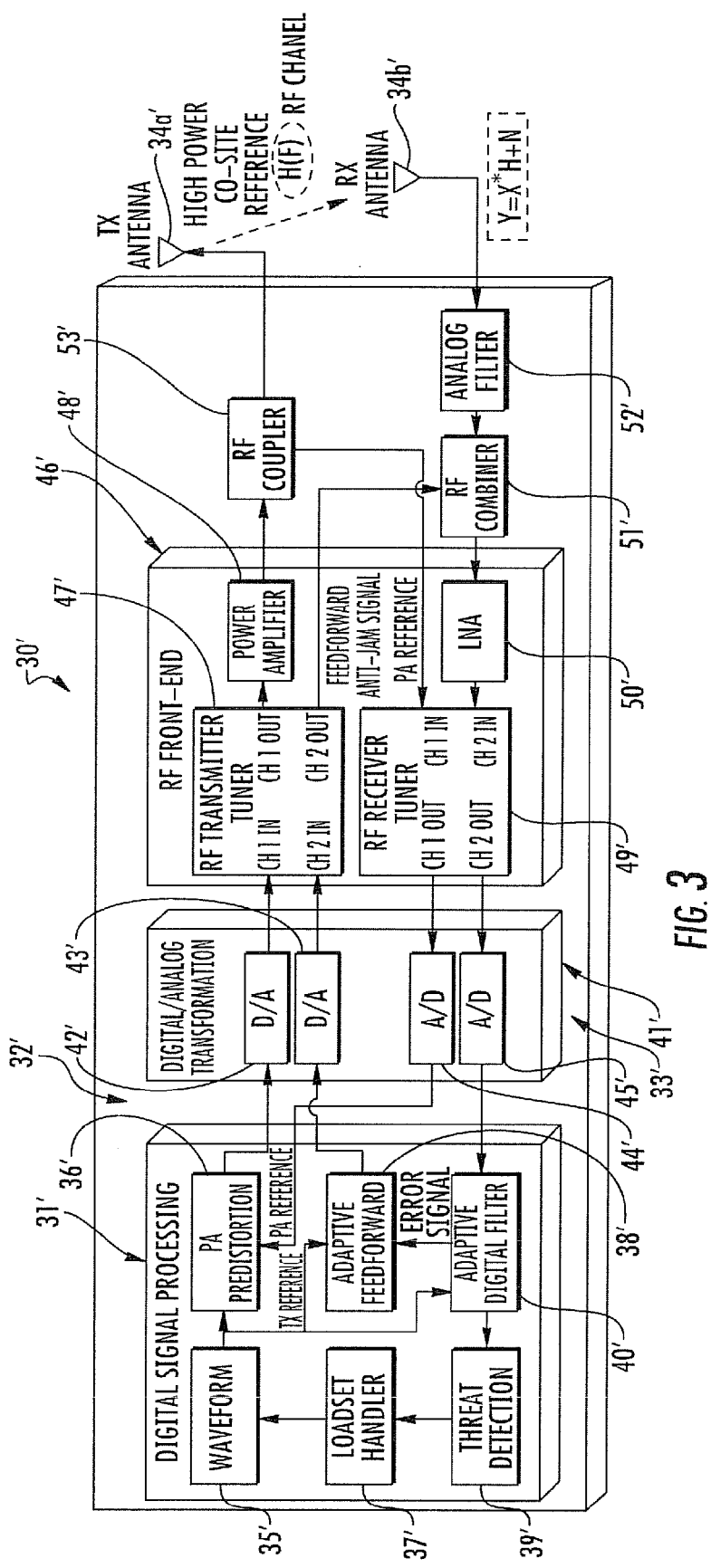
FIG. 3 is a detailed schematic diagram of another embodiment of the communications device, according to the present invention.

Referring now additionally to FIG. 3, another embodiment of the communications device 30' is now described. In this embodiment of the communications device 30', those elements already discussed above with respect to FIGS. 1-2 are given prime notation and most require no further discussion herein. This embodiment differs from the previous embodiment in that this communications device 30' illustratively includes a first antenna 34a' coupled to the transmit path 32', and a second antenna 34b' coupled to the receive path 33'. Helpfully, the transmit path 32' to receive path 33' isolation value is increased in this embodiment.

Figure 4:
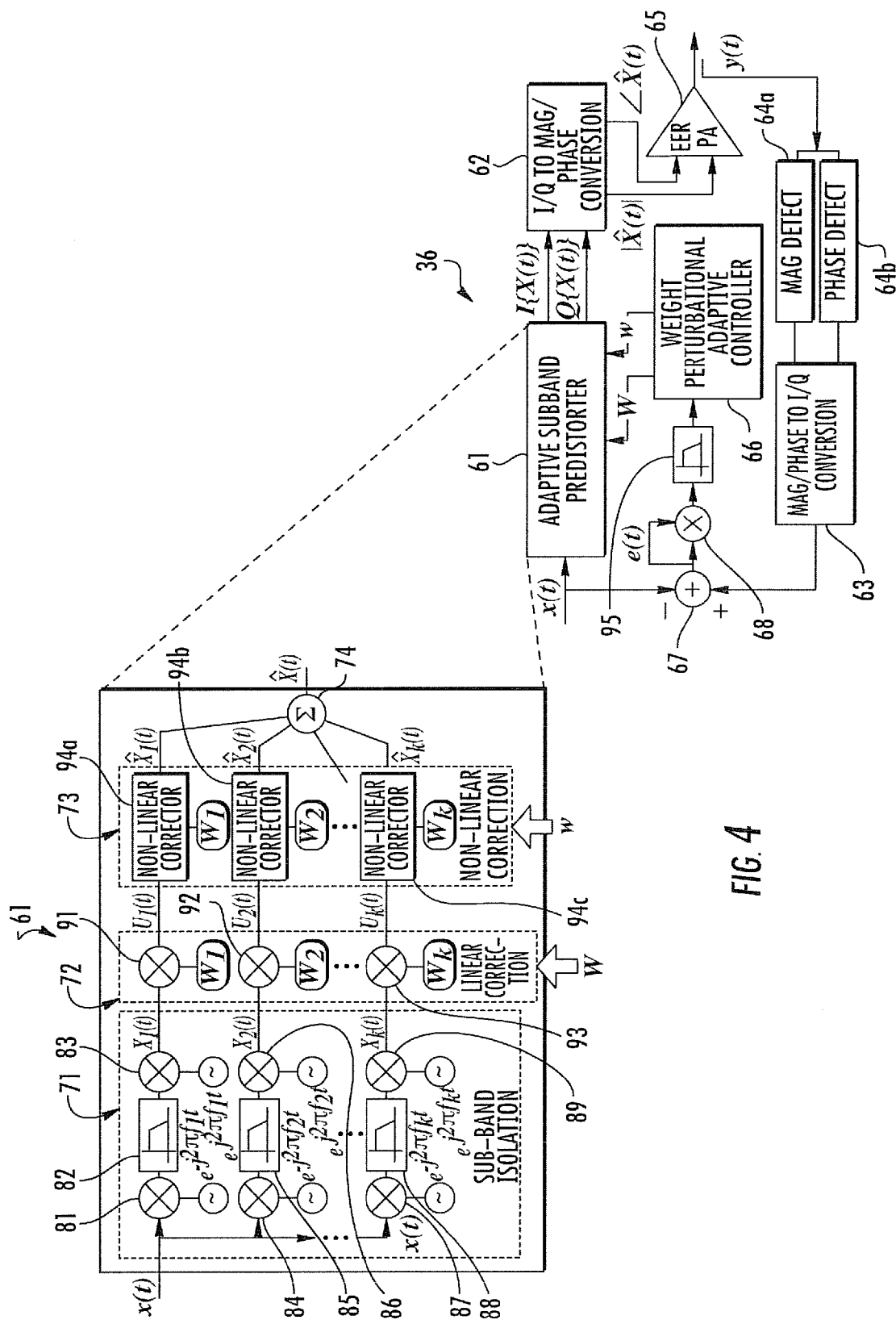
FIG. 4 is a schematic diagram of the predistortion circuit from the communications device of FIG. 2.

Referring now to FIG. 4, the power amplifier predistortion circuit 36 is now described. The power amplifier predistortion circuit 36 includes an adaptive sub-band predistorter 61 configured to receive an input signal x(t) and output in-phase (I) and quadrature (Q) signals, and a phase conversion circuit 62 configured to receive the I and Q signals and output magnitude and phase signals. The power amplifier predistortion circuit 36 includes an envelope elimination and restoration (EER) power amplifier 65 configured to amplify the magnitude and phase signals, and magnitude and phase detectors 64a-64b configured to process a feedback signal y(t). The power amplifier predistortion circuit 36 illustratively includes a converter 63 configured to convert the magnitude and phase signals, a summer 67 for adding an output of the converter and the input signal, a multiplier 68 configured to multiply an output of the summer and an error signal e(t), a low pass filter circuit 95 configured to process an output of the multiplier, and an adaptive controller 66 configured to process an output of the filter circuit.

The adaptive sub-band predistorter 61 includes a sub-band isolation circuit 71, a linear correction circuit 72 coupled to the sub-band isolation circuit, and a non-linear correction circuit 73 coupled to the linear correction circuit. The sub-band isolation circuit 71 illustratively includes a first plurality of multipliers 81, 84, 87 receiving an input signal, a plurality of low pass filters 82, 85, 88 coupled to the first plurality of multipliers, and a second plurality of multipliers 83, 86, 89 coupled to the plurality of low pass filters. The linear correction circuit 72 includes a third plurality of multipliers 91-93 configured to receive the outputs of the second plurality of multipliers. The non-linear correction circuit 73 illustratively includes a plurality of non-linear corrector circuits 94a-94c configured to receive the outputs of the third plurality of multipliers. The adaptive sub-band predistorter 61 illustratively includes a summer 74 configured to sum outputs of each of the non-linear corrector circuits 94a-94c. Although the illustrated embodiment of the adaptive sub-band predistorter 61 includes three paths, other embodiments may be readily extended to more paths.

The power amplifier predistortion circuit 36 operates based upon the following formulas.

Input Sub-Bands $$\hat{X}_0(t) = h_0(t) * x'(t)$$
$$\hat{X}_1(t) = h_1(t) * x'(t)$$
$$\hat{X}_2(t) = h_2(t) * x'(t)$$
...
$$\hat{X}_K(t) = h_K(t) * x'(t)$$

Recombined Signal $$\hat{X}(t) = \sum_{k=1}^{K} X_k(t)$$

Gradient Operator $$\nabla_W = \frac{\partial}{\partial W_1}\vec{a}_i + \frac{\partial}{\partial W_2}\vec{a}_2 + \ldots + \frac{\partial}{\partial W_K}\vec{a}_K = 0$$

Error Signal $$e(t) = y(t) - x(t) = F[W^T x'(t)] - x(t)$$

Estimate of Weight Partial Derivative $$\frac{\Delta W_k}{\Delta t} = -\frac{\{E[[y(t, W + \delta W_k) - x(t)]^2 - [y(t, W - \delta W_k) - x(t)]^2]\}}{\Delta W_k}$$

FIG. 4 shows an actual implementation of processing circuitry 31 on a broadcast power amplifier in order to pass Federal Communications Commission (FCC) regulations. The amount of distortion canceled depends on how accurately the power amplifier can be modeled using this approach. The input signal x(t) is broken-up into individual sub-bands. Then, each sub-band receives a linear and non-linear correction. W is a complex single-tap weight vector. Then, a non-linear transfer function may be applied. For this embodiment, a simple quadratic non-linearity with coefficient w is sufficient. The sub-band signals are then recombined and applied to the power amplifier input. The predistortion cancels with the amplifier 65 distortion to produce a linearized output signal.

Figure 5:
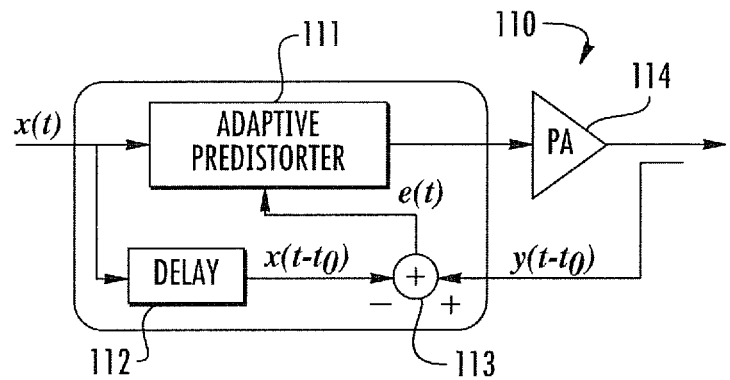
FIG. 5 is a schematic diagram of a transmitter chain, according to the present invention.

Referring now additionally to FIG. 5, a schematic diagram 110 illustrates a predistortion and small gain theorem. The diagram 110 illustratively includes a power amplifier 114, and an adaptive predistorter 111 configured to provide an input for the power amplifier. The schematic 110 also illustratively includes a delay module 112 configured to create a delayed version of the input signal, and a summer 113 configured to sum the delayed version of the input signal and the feedback signal. The feedback signal is governed by the following formula.

$$y(t-t_o) = (G \cdot x(t)) * \delta(t-t_o)$$

Small gain theorem allows d(t) to be subtracted from the input to cancel it from the output via the following formula.

$$y(t-t_o) = \left(G \cdot \left(x(t) - \frac{d(t)}{G}\right) + d(t)\right) * \delta(t-t_o)$$
$$= (G \cdot x(t)) * \delta(t-t_o)$$

Figure 6:
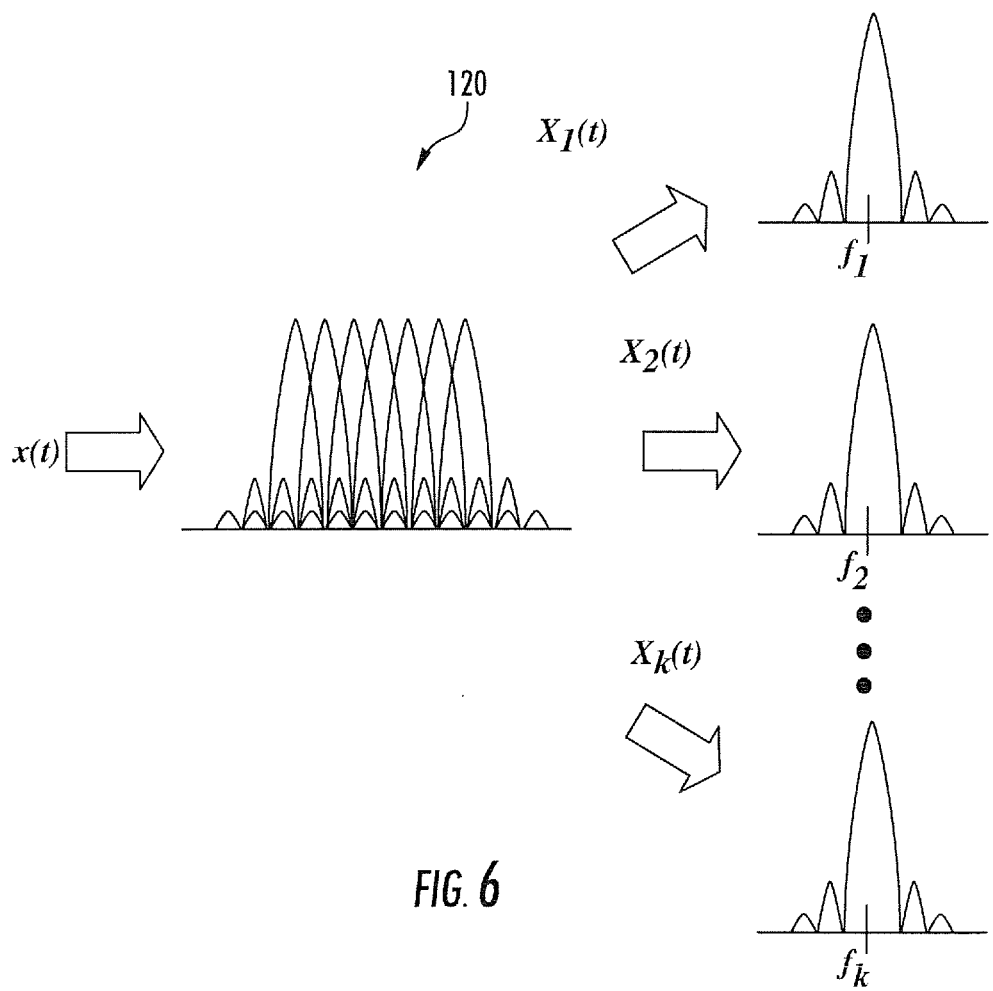
FIG. 6 is a schematic diagram of memory effect in the communications device of FIG. 2.

Referring now additionally to FIG. 6, a diagram 120 illustrates mitigation of memory effects in the communications device 30. Transversal filters sin(x)/x decompose the signal x(t) into orthogonal sub-bands $X_1(t)$, $X_2(t)$, and $X_3(t)$. In such case, the time delay is not constant across the entire frequency band. However, by dividing the entire signal bandwidth into appropriately smaller separate sub-bands, each sub-band approximates a constant delay (i.e. linear phase response). The principle is similar to the way OFDM converts frequency selective fading into flat-fading by sub-dividing the signal bandwidth into smaller narrow-band subcarriers. The first step of the sub-band predistorter is isolating several K sub-band signals $X_K(t)$. Each sub-band k signal comprises a portion of the input signal x(t) contained in a predetermined frequency bandwidth B/k defined within the total bandwidth B of the input signal.

Figure 7:
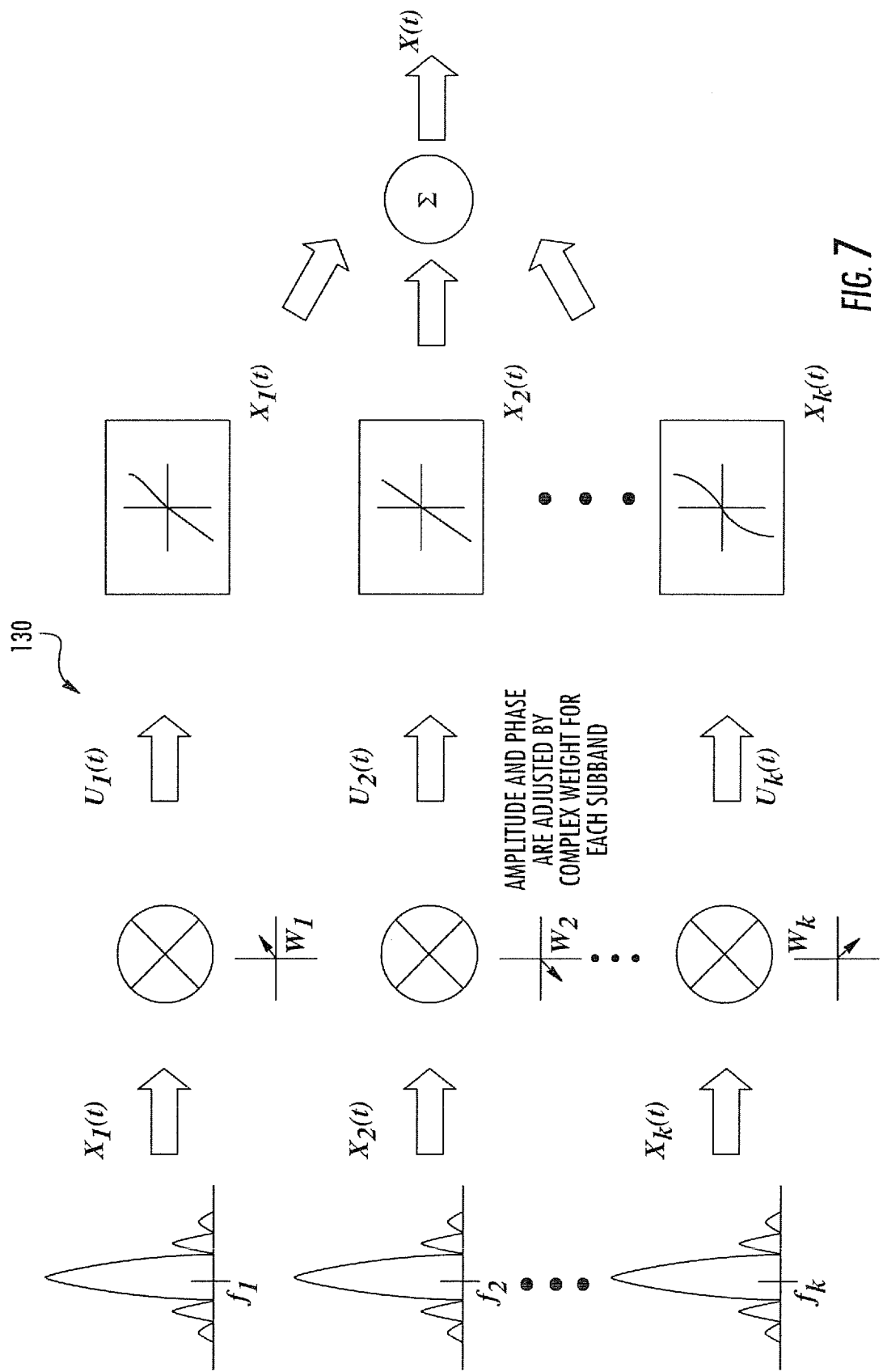
FIG. 7 is a schematic diagram of adaptive sub-band predistortion in the communications device of FIG. 2.

Referring now additionally to FIG. 7, a diagram 130 illustrates adaptive sub-band predistortion in the communications device 30. Each sub-band signal $X_k(t)$ is then independently modified in magnitude and phase, resulting in $U_k(t)$, i.e. U=X*W. Each sub-band may then be modified in its AM-to-AM (amplitude modulation to amplitude modulation) response, typically with a simple quadratic non-linearity, e.g. X-hat=U(1+w*mag(U)). This is an empirical notion, based on expectation that the system is nearly linear, but slightly susceptible to saturation. A non-linear boost in amplitude might then overcome a slight saturation. This method can be particularly effective in linearizing high power amplifiers exhibiting memory effects. The modest non-linearity introduced by the amplifier allows such a distortion to be applied on an individual sub-band basis with minimal effects on the other orthogonally isolated sub-bands.

Figure 8:
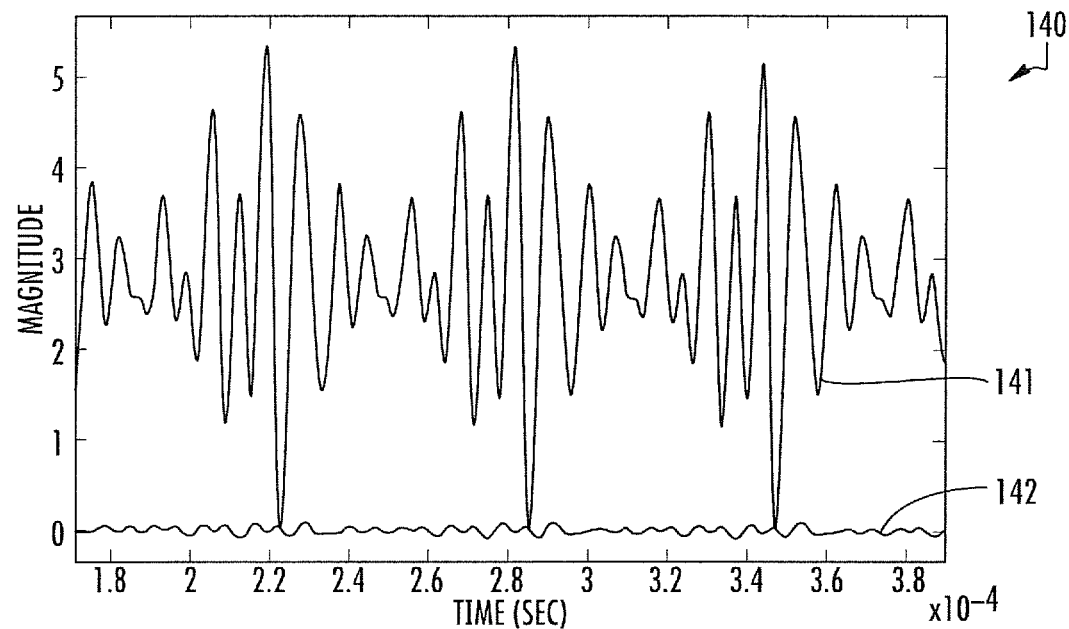
FIGS. 8-10 are diagrams of amplitude correction in the communications device of FIG. 2.
Figure 9:
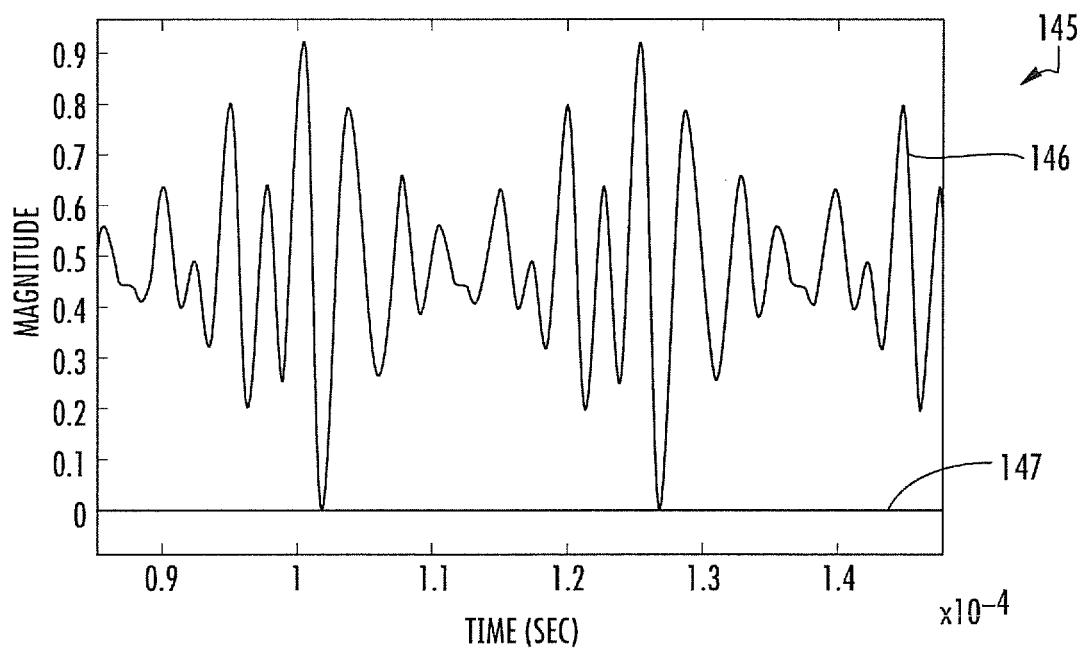
Figure 10:
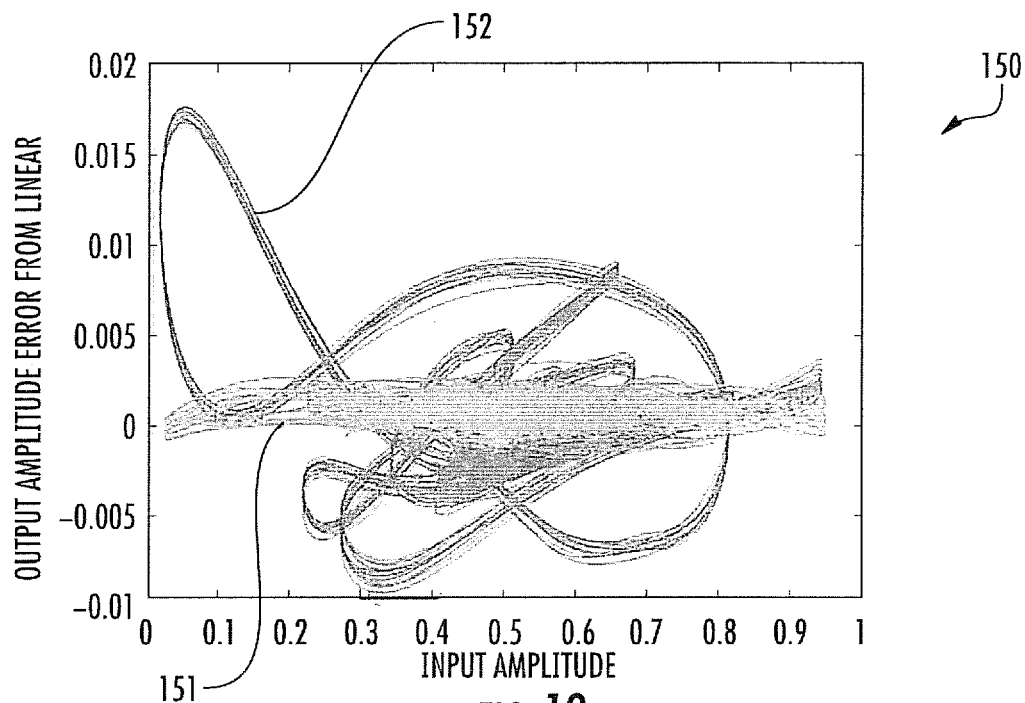

Referring now additionally to FIGS. 8-10, diagrams 140, 145, 150 illustrate amplitude correction in the communications device 30. Diagrams 140 and 145 illustrate signals before and after correction, respectively. Curves 142 and 147 illustrate magnitude error, and curves 141 and 146 illustrate an output signal. Diagram 150 illustrates AM-AM error from linear fitting with curve 152 showing before the correction and curve 151 showing after the correction. These diagrams 140, 145, 150 relate to an example input—multi-carrier periodic signal. The error signal equals the scaled power amplifier input minus the power amplifier output. The periodic input signal traverses the same path, and an output exhibits memory effects.

Figure 11:
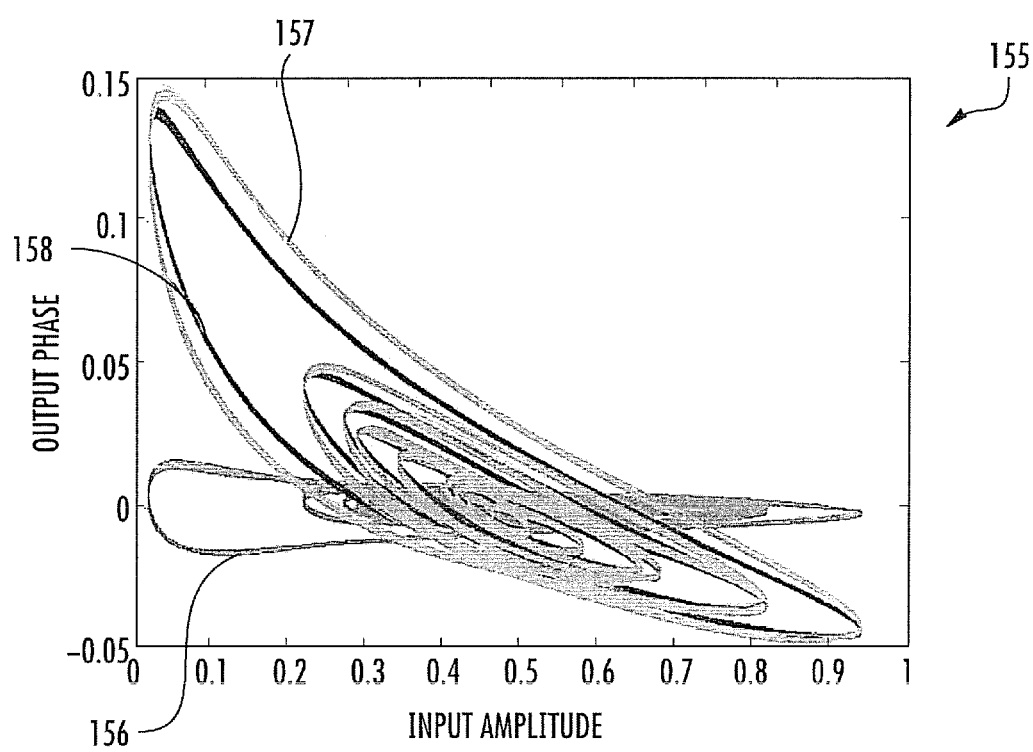
FIGS. 11-13 are diagrams of phase correction in the communications device of FIG. 2.
Figure 12:
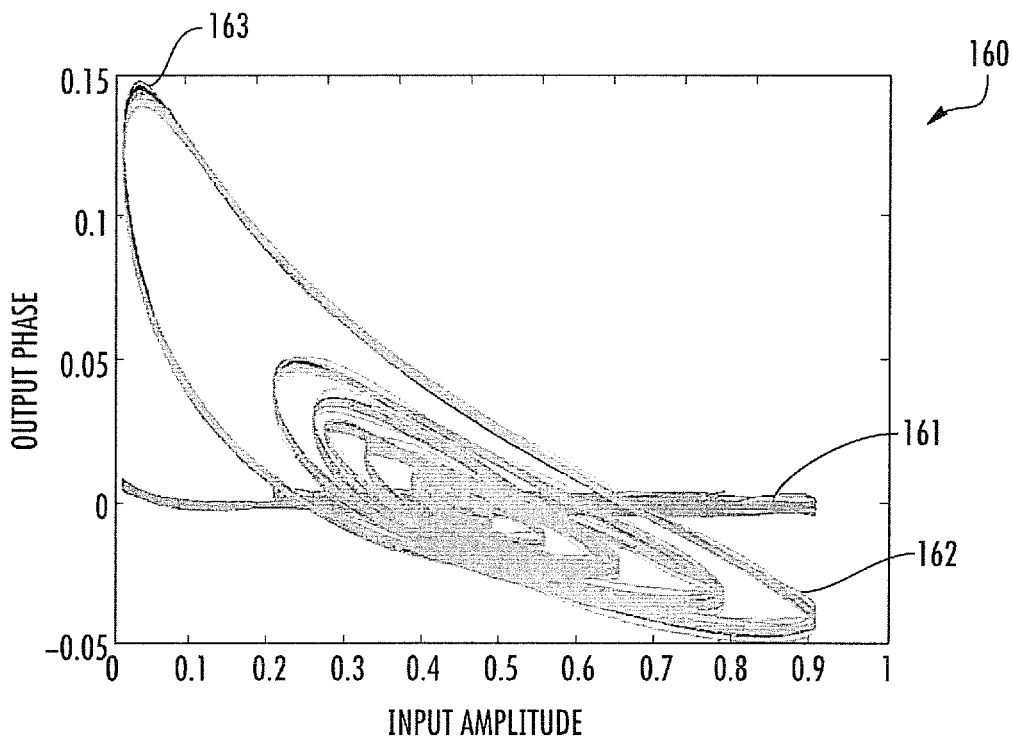
Figure 13:
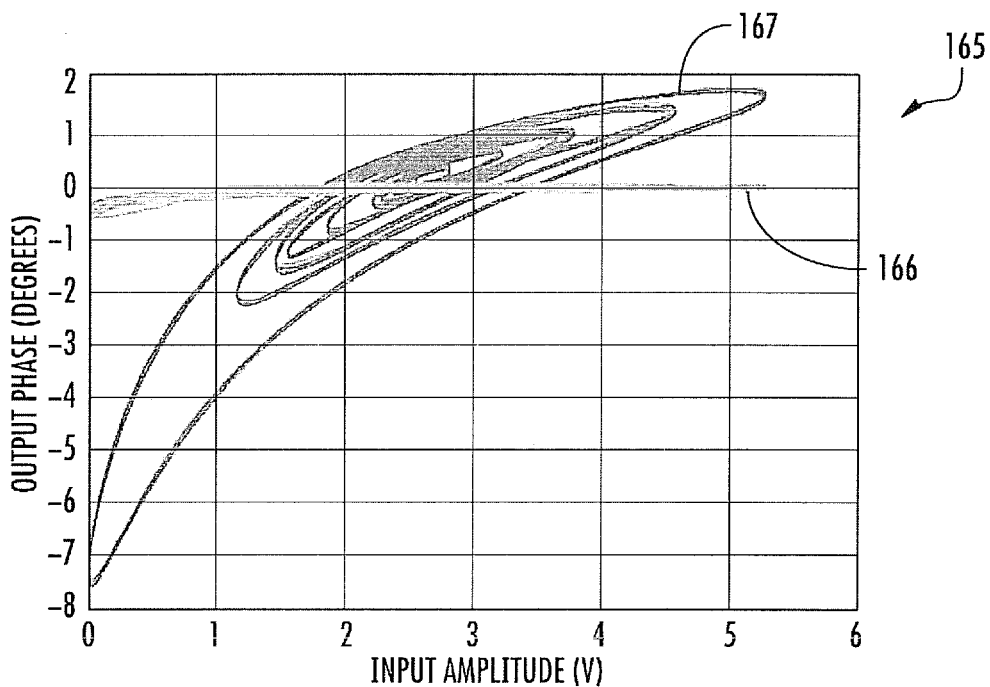

Referring now additionally to FIGS. 11-13, diagrams 155, 160, 165 illustrate phase correction in the communications device 30. Diagram 155 illustrates predistorted phase (AM-PM (phase modulation) correction) in the communication device 30, and includes a curve 156 showing an improved AM-PM, a curve 157 showing a new AM-PM error signal, and a curve 158 showing the previous AM-PM signal. Diagram 160 illustrates predistorted phase (AM-PM correction) in the communication device 30, and includes a curve 161 showing an improved AM-PM, a curve 162 showing a new AM-PM error signal, and a curve 163 showing the previous AM-PM signal. Diagram 165 illustrates AM-PM distortion in the communication device 30, and includes a curve 166 showing residual phase error after predistortion, and a curve 167 showing residual phase error before predistortion.

Figure 14:
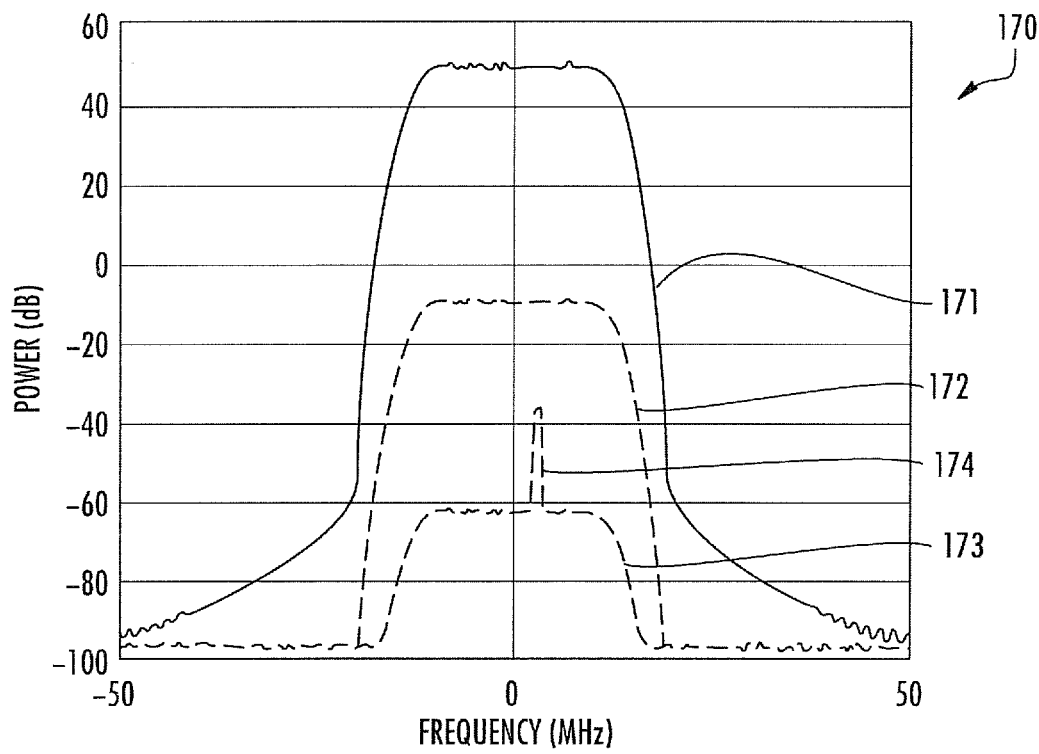
FIGS. 14-15 are diagrams of power spectrum estimates in the communications device of FIG. 2.
Figure 15:
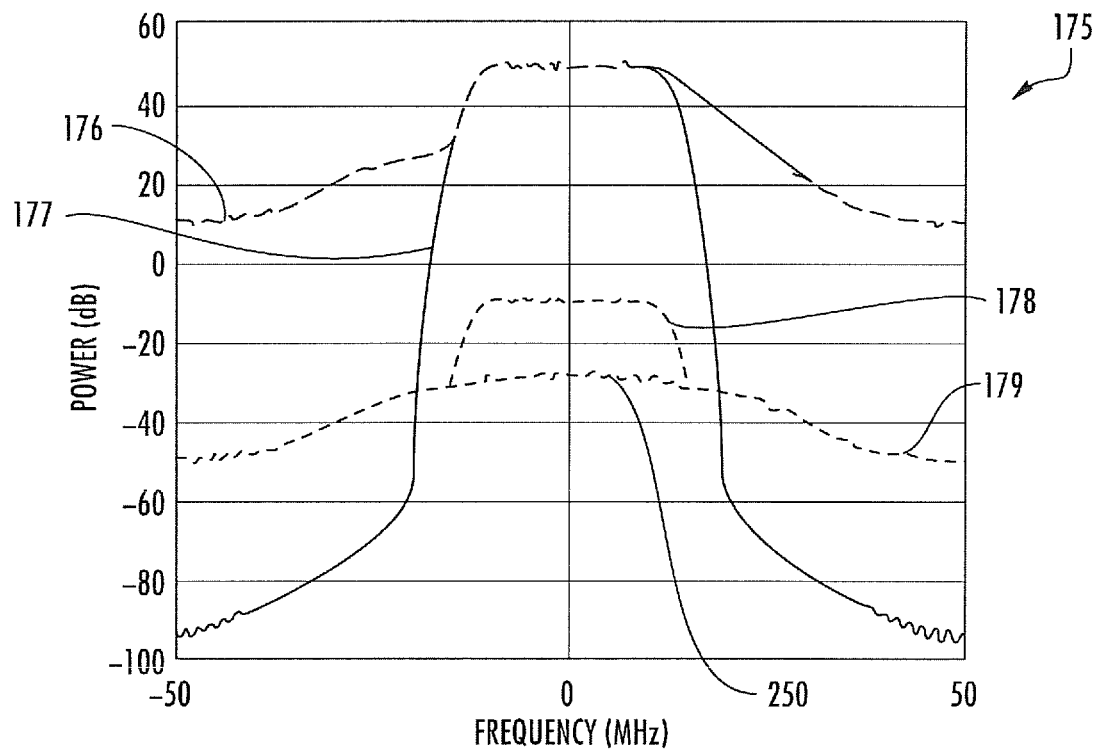

Referring now additionally to FIGS. 14-15, diagrams 170, 175 illustrate power spectrum estimates in the communications device 30. Diagram 170 illustrates the power spectrum estimate with a linear power amplifier model. Curve 171 represents transmitted output (Transmit power=50 dBm at 100 Watts), curve 172 illustrates received signal input (transmit signal at receive input=−10 dBm), which shows a transmit to receive isolation of 60 dB, and curve 173 illustrates the received input after cancelation processing in the communications device 30. Note, curve 173 now clearly shows the SOI 174 (SOI at −35 dBm) since the adaptive feedforward algorithm cancellation has reduced self-interference by 50 dB).

Diagram 175 illustrates the power spectrum estimate with a linear power amplifier model (back off=4 dB). Curve 177 represents transmitted output (Transmit power=50 dBm at 100 Watts), curve 178 illustrates received signal input (transmit signal at receive input=−10 dBm), which shows a transmit to receive isolation of 60 dB, and curve 179 illustrates the received input after cancellation processing in the communications device 30 when using a power amplifier with nonlinearities and no predistortion (i.e. no PA linearization is applied), and curve 176 illustrates a non-linear power amplifier output (significant out-of-band noise is shown, which may lead to adjacent channel interference). Note, curve 179 now clearly shows that SOI 250 is at or below the self-interference noise floor due to nonlinear distortion caused by the power amplifier leading to significant in-band noise that is masking the signal of interest (SOI) at −35 dBm. This example clearly illustrates the need for PA linearization in order to reduce the in-band noise to allow for desirable feedforward interference cancellation.

Figure 16:
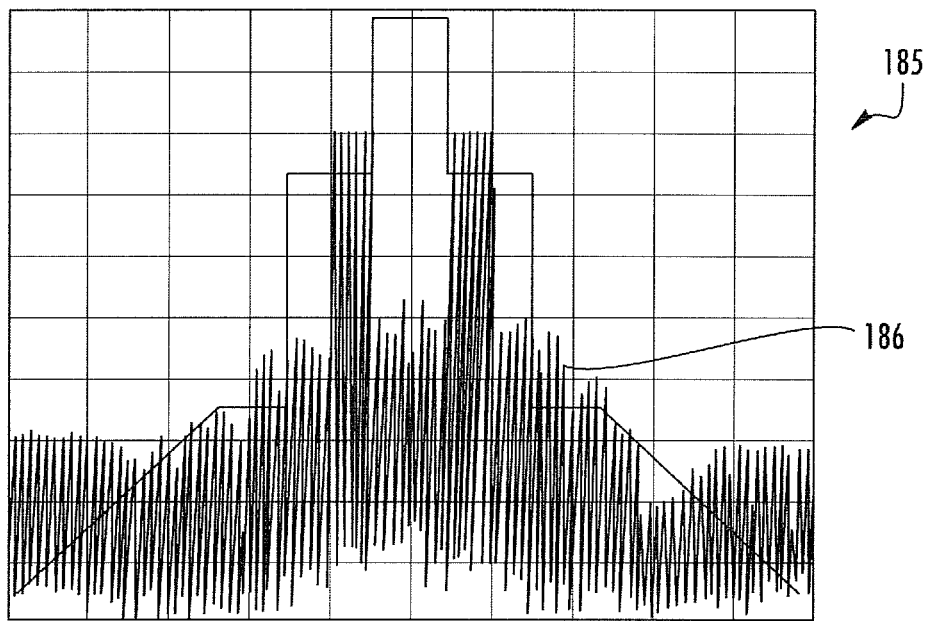
FIGS. 16-17 are diagrams of the received signal in the communications device of FIG. 2.
Figure 17:
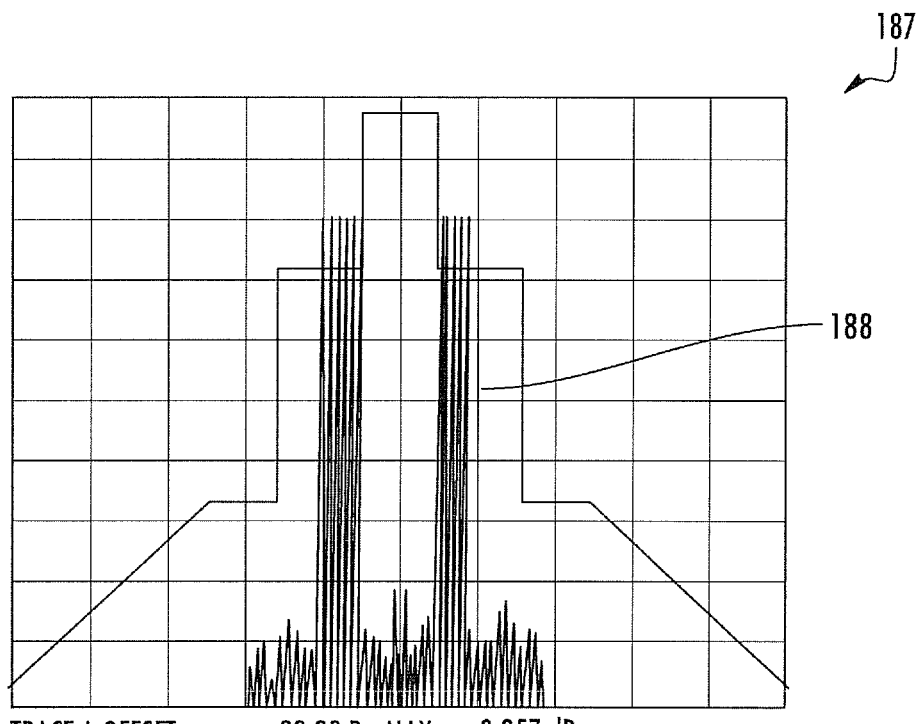

Advantageously, the PA linearization also reduces out-of-band noise and adjacent channel interference. In other words, the predistortion aspect of the present invention of simultaneous transmit and receive provides for the desired performance of FIG. 14 instead of the undesired performance of FIG. 15. Referring now additionally to FIGS. 16-17, diagrams 185, 187 illustrate received signals in the communications device 30. Curve 186 illustrates the received signal with feedforward correction disabled, and curve 188 illustrates the received signal with feedforward correction enabled, providing a 30 dB reduction in self-interference and a dynamic range of 90 dB. Advantageously, the feedforward was proven on a 1000 Watt power amplifier and allowed broadcast within the FCC approved spectral mask.

Figure 18:
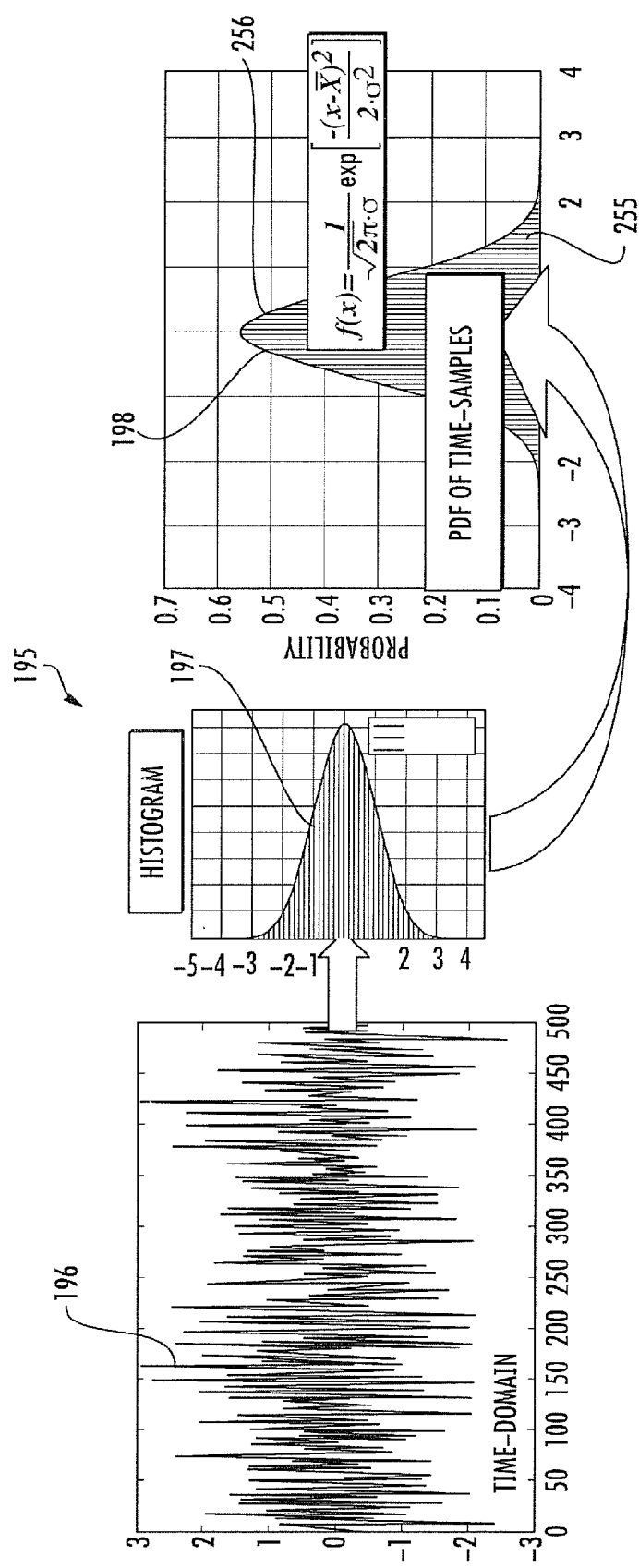
FIG. 18 is a diagram of signal probability distribution in the communications device of FIG. 2.
Figure 19:
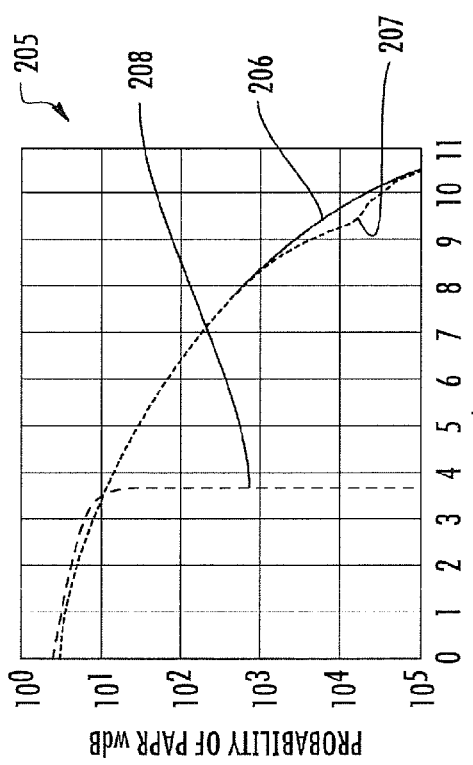
FIGS. 19-22 are diagrams of complementary cumulative distribution function (CCDF) curves in the communications device of FIG. 2.
Figure 20:
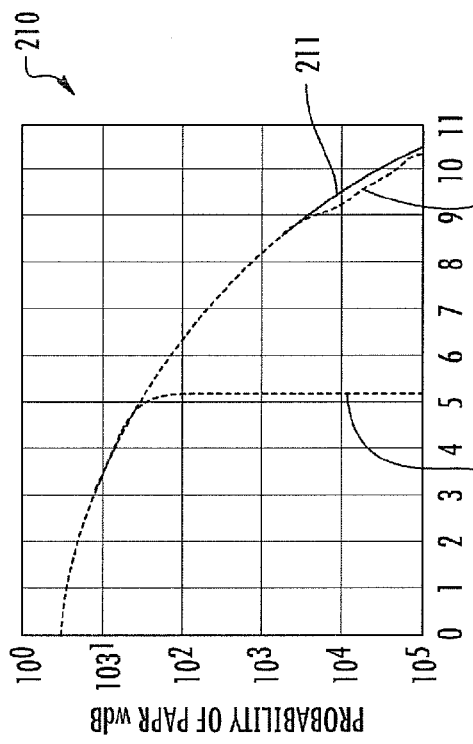
Figure 21:
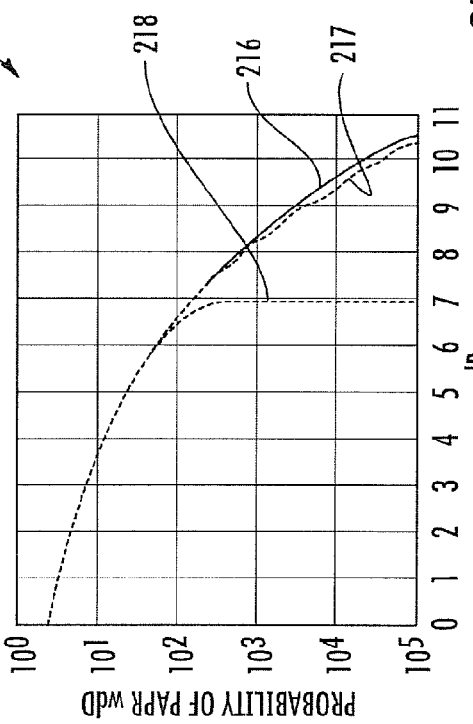
Figure 22:
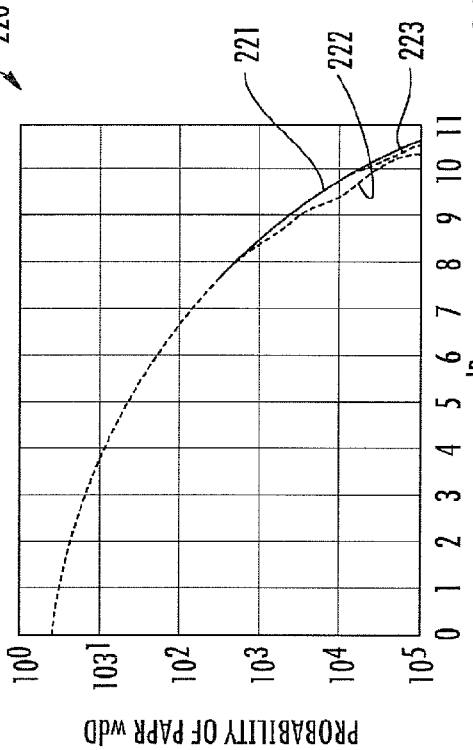

Referring now additionally to FIG. 18, a diagram 195 illustrates signal probability distribution in the communications device 30. Curve 196 illustrates the time domain signal, and curves 197-198, 255-256 illustrate histograms of OFDM time-domain samples (198: Gaussian probability distribution function (PDF); 255: OFDM samples (imaginary part); and 256: OFDM samples (real part)).

Referring now additionally to FIGS. 19-23, diagrams 205, 210, 215, 220 illustrate power amplifier compression-CCDF curves in the communications device 30 respectively at a 4 dBm back off, a 6 dBm back off, a 8 dBm back off, and a 12 dBm back off, respectively. Curves 206, 211, 216, 221 illustrate the CCDF. Curves 207, 212, 217, 222 illustrate the power amplifier input, and curves 208, 213, 218, 223 illustrate the power amplifier output. Diagram 230 illustrates amplitude and time alignment precision in the communications device 30.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
    a transmit path comprising first and second digital-to-analog converters (DACs) and having at least one non-linear characteristic;
    a receive path operable simultaneously with said transmit path and at a same frequency as said transmit path;
    said receive path comprising first and second analog-to-digital converters (ADCs); and
    processing circuitry configured to
        generate a baseband signal for said transmit path,
        generate a feedforward signal based upon the baseband signal,
        use the feedforward signal to reduce self-interference in said receive path from said transmit path, and
        pre-distort the baseband signal based upon the at least one non-linear characteristic;
    said transmit path configured to generate an analog feedforward signal based upon the feedforward signal, and generate a transmit output signal;
    said receive path comprising a combiner configured to combine the analog feedforward signal and an analog receive signal;
    said processing circuitry comprising a sub-band predistorter configured to receive an input signal and generate in-phase (I) and quadrature (Q) signals, and a phase conversion circuit configured to receive the I and Q signals and output at least one intermediate signal, the baseband signal being based upon the at least one intermediate signal.

2. The communications device of claim 1 wherein said processing circuitry is configured to generate the feedforward signal as an inverted replica of the baseband signal.

3. The communications device of claim 1 wherein said receive path is configured to generate an error signal so that the feedforward signal is further based upon the error signal.

4. The communications device of claim 3 wherein the error signal is based upon a frequency domain response of said receive path.

5. The communications device of claim 1 wherein said processing circuitry is configured to time align the feedforward signal based upon the transmit output signal and scale the feedforward signal based upon the transmit output signal.

6. The communications device of claim 1 wherein said processing circuitry is configured to generate the baseband signal comprising an orthogonal frequency-division multiplexing (OFDM) signal.

7. The communications device of claim 1 further comprising at least one antenna coupled to said transmit and said receive paths.

8. The communications device of claim 7 wherein said at least one antenna comprises a first antenna coupled to said transmit path, and a second antenna coupled to said receive path.

9. A communications device comprising:
a transmit path comprising first and second digital-to-analog converters (DACs);
a receive path operable simultaneously with said transmit path and at a same frequency as said transmit path and configured to generate an error signal;
said receive path comprising first and second analog-to-digital converters (ADCs);
at least one antenna coupled to said transmit and said receive paths; and
processing circuitry configured to
generate a baseband signal for said transmit path,
generate a feedforward signal as an inverted replica of the baseband signal and based upon the error signal, and
use the feedforward signal to reduce self-interference in said receive path from said transmit path;
said first and second DACs configured to respectively generate an analog feedforward signal based upon the feedforward signal, and a transmit output signal;
said processing circuitry configured to generate the feedforward signal based upon the error signal comprising a difference between a scaled version of the baseband signal and the transmit output signal;
said receive path comprising a combiner configured to combine the analog feedforward signal and an analog receive signal;
said first ADC configured to generate a reference signal for said processing circuitry, the reference signal indicating at least one non-linear characteristic of said transmit path;
said second ADC configured to generate a receive signal based upon a combined signal from said combiner;
said processing circuitry comprising a sub-band predistorter configured to receive an input signal and generate in-phase (I) and quadrature (Q) signals, and a phase conversion circuit configured to receive the I and Q signals and output at least one intermediate signal, the baseband signal being based upon the at least one intermediate signal.

10. The communications device of claim 9 wherein the error signal is based upon a frequency domain response of said receive path.

11. The communications device of claim 9 wherein said processing circuitry is configured to pre-distort the baseband signal based upon the at least one non-linear characteristic.

12. The communications device of claim 9 wherein said processing circuitry is configured to time align the feedforward signal based upon the transmit output signal and scale the feedforward signal based upon the transmit output signal.

13. The communications device of claim 9 wherein said processing circuitry is configured to generate the baseband signal comprising an orthogonal frequency-division multiplexing (OFDM) signal.

14. A method of operating a communications device comprising a transmit path including first and second digital-to-analog converters (DACs) and having at least one non-linear characteristic, and a receive path comprising first and second analog-to-digital converters (ADCs), the receive path being operable simultaneously with the transmit path and at a same frequency as the transmit path, the method comprising:
operating processing circuitry coupled to the transmit and receive paths to
generate a baseband signal for the transmit path,
generate a feedforward signal based upon the baseband signal,
use the feedforward signal to reduce self-interference in the receive path from the transmit path, and
pre-distort the baseband signal based upon the at least one non-linear characteristic;
operating the transmit path to generate an analog feedforward signal based upon the feedforward signal, and generate a transmit output signal, the receive path combining the analog feedforward signal and an analog receive signal; and
operating a sub-band predistorter in the processing circuitry to receive an input signal and generate in-phase (I) and quadrature (Q) signals, and operating a phase conversion circuit in the processing circuitry to receive the I and Q signals and output at least one intermediate signal, the baseband signal being based upon the at least one intermediate signal.

15. The method of claim 14 further comprising operating the processing circuitry to generate the feedforward signal as an inverted replica of the baseband signal.

16. The method of claim 14 further comprising operating the receive path to generate an error signal so that the feedforward signal is further based upon the error signal.

17. The method of claim 16 wherein the error signal is based upon a frequency domain response of the receive path.

18. The method of claim 14 further comprising operating the processing circuitry to time align the feedforward signal based upon the transmit output signal and scale the feedforward signal based upon the transmit output signal.

19. The method of claim 14 further comprising operating the processing circuitry to generate the baseband signal comprising an orthogonal frequency-division multiplexing (OFDM) signal.

* * * * *